US011647533B2

(12) United States Patent
Ramu et al.

(10) Patent No.: US 11,647,533 B2
(45) Date of Patent: May 9, 2023

(54) DEVICE, SYSTEM AND METHOD FOR DYNAMICALLY ADJUSTING A QUEUE STRUCTURE AND MESSAGE SEQUENCING

(71) Applicant: MOTOROLA SOLUTIONS, INC., Chicago, IL (US)

(72) Inventors: Shivakumar Bangalore Ramu, Chicago, IL (US); Yunhai Yang, Chicago, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 214 days.

(21) Appl. No.: 17/087,048

(22) Filed: Nov. 2, 2020

(65) Prior Publication Data

US 2022/0141826 A1  May 5, 2022

(51) Int. Cl.
*H04W 72/06* (2009.01)
*H04W 72/563* (2023.01)
*G06F 16/9035* (2019.01)
*H04W 72/0453* (2023.01)
*H04W 74/00* (2009.01)

(52) U.S. Cl.
CPC ...... *H04W 72/563* (2023.01); *G06F 16/9035* (2019.01); *H04W 72/0453* (2013.01); *H04W 74/002* (2013.01)

(58) Field of Classification Search
CPC ............ H04W 72/06; H04W 72/0453; H04W 74/002; H04W 24/10; H04W 24/02; G06F 16/9035
See application file for complete search history.

(56) References Cited

U.S. PATENT DOCUMENTS

| 6,832,259 | B2 | 12/2004 | Hymel | |
|---|---|---|---|---|
| 7,640,373 | B2 | 12/2009 | Cudak | |
| 7,941,491 | B2 | 5/2011 | Sood | |
| 2015/0257141 | A1* | 9/2015 | Kulal | H04W 72/0406 370/329 |
| 2019/0181929 | A1* | 6/2019 | Ge | H04B 7/0632 |
| 2022/0110015 | A1* | 4/2022 | Krishnamurthy | H04W 72/08 |
| 2022/0237685 | A1* | 7/2022 | Liao | G06Q 30/0201 |

FOREIGN PATENT DOCUMENTS

| CN | 102404853 A | * | 4/2012 | .......... H04W 52/243 |
|---|---|---|---|---|
| WO | WO-2020160700 A1 | * | 8/2020 | ........... H04B 7/0626 |

OTHER PUBLICATIONS

Abhishek Kumar, What is a Rank Indication in LTE?, https://lte-question.blogspot.com/2013/07/rank-indicaton-in-lte.html, Jul. 12, 2013 (Year: 2013).*

* cited by examiner

*Primary Examiner* — Mounir Moutaouakil
(74) *Attorney, Agent, or Firm* — Perry + Currier, Inc.

(57) ABSTRACT

A device, system and method for dynamically adjusting a queue structure and message sequencing is provided. A device receives, from one or more edge devices receiving outbound signaling messages on one or more control channels, rankings of previously transmitted outbound signaling messages. The device adjusts (and/or causes adjusting of) one or more of a queue structure and a message sequence of the outbound signaling messages based on the rankings. The device transmits (and/or causes transmission), to the one or more edge devices, the outbound signaling messages according to one or more of the queue structure and the message sequence, as adjusted.

19 Claims, 5 Drawing Sheets

DEVICE, SYSTEM AND METHOD FOR DYNAMICALLY ADJUSTING A QUEUE STRUCTURE AND MESSAGE SEQUENCING

BACKGROUND

Wireless communication infrastructure for transmitting signaling messages on a control channel is generally performed via a queue having a predefined structure, for example at individual base stations (e.g. of a cell site and/or wireless communication site), and the like.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
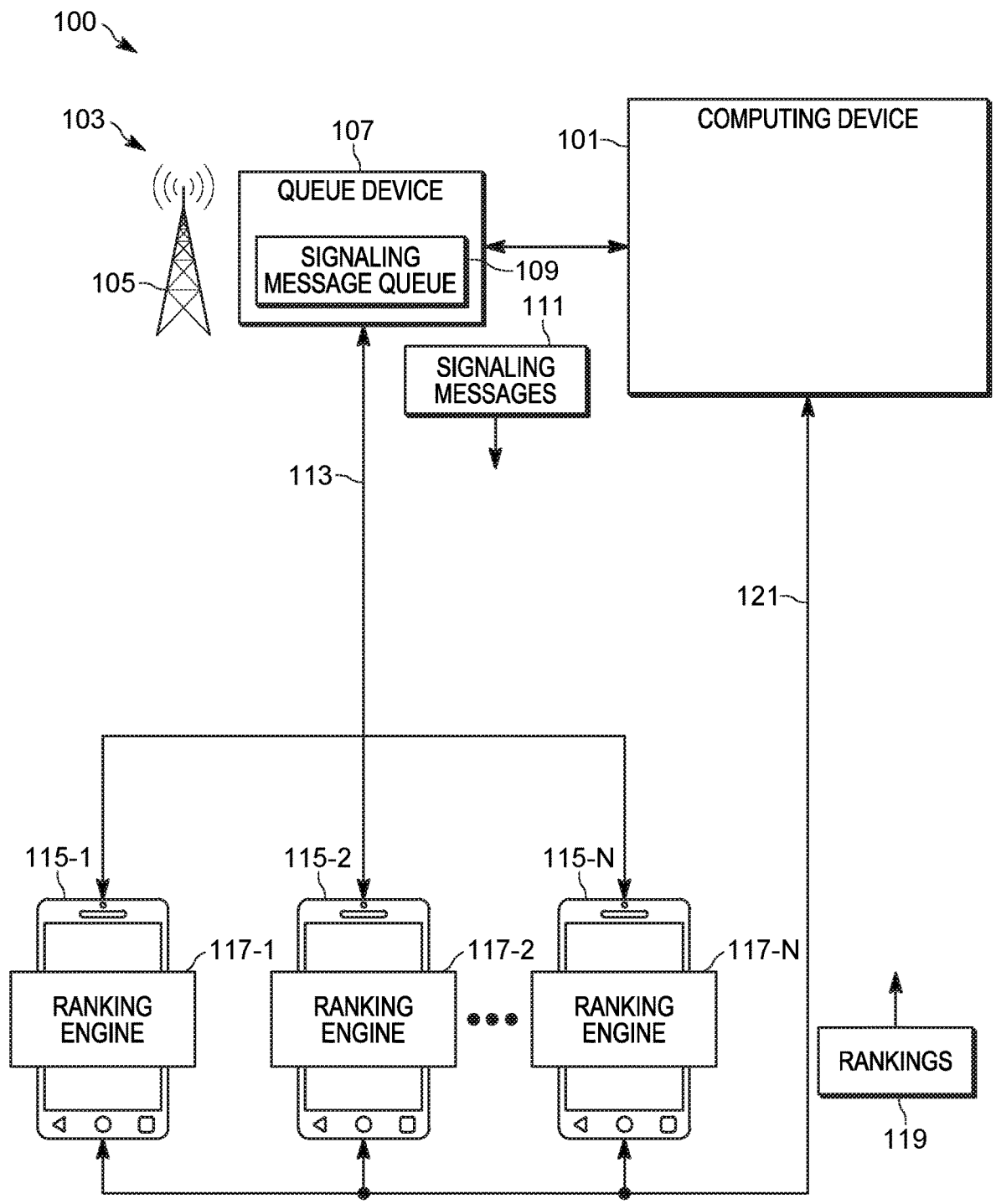
FIG. 1 is a system for dynamically adjusting a queue structure and message sequencing in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Wireless communication infrastructure for transmitting signaling messages on a control channel is generally performed via a queue having a predefined structure, for example at individual base stations (e.g. of a cell site and/or wireless communication site), and the like. However, traffic priority can change over time, in particular for wireless communication devices used by public safety personnel, first responders, and the like. For example, an incident may occur that causes messaging traffic of given types to increase, such as voice traffic, and an existing queue for transmitting signaling messages on a control channel, with a predefined structure, may not be adequately reflect a current state of messaging traffic. For example, a need for voice traffic may increase, but the queue may be transmitting signaling messages which schedule time slots (e.g. in a time-division multiple access (TDMA) network) for voice messages at a fixed rate. Similarly, in other situations, at a site, a number of edge devices which are enabled to communicate via data, but are not enabled to communicate via voice, may increase, or vice versa, but the queue may be transmitting signaling messages which schedule time slots for data and/or voice messages at a fixed rate.

Hence, provided herein is a computing device which manages outbound signaling messages on one or more control channels, the computing device adapted to receive, from one or more edge devices receiving the outbound signaling messages, rankings of previously transmitted outbound signaling messages. Hence, the edge devices are adapted to rank such received outbound signaling messages (e.g. outbound signaling messages refer to signaling messages transmitted to the edge devices) and transmit the rankings to the computing device. Rankings may be based on usefulness and/or effectiveness of received outbound signaling messages. For example, usefulness may be understood herein as whether, or not, an edge device undergoes a change in state due to a received outbound signaling message, and/or whether, or not, an edge device uses data from an outbound signaling message; and effectiveness may be understood herein as timeliness of a received outbound signaling message and/or a lateness of a received outbound signaling message, and the like.

The computing device receives the rankings, and generally causes one or more of a queue structure and a message sequence of the outbound signaling messages to be adjusted based on the rankings. As such, the computing device may cause transmitting, to the one or more edge devices, the outbound signaling messages according to one or more of the queue structure and the message sequence, as adjusted.

For example, new outbound signaling messages may be assigned a priority at the computing device (and/or a computing device of a site at which a queue is located) based on the rankings. For example, new outbound signaling messages that are of a similar type, as relatively higher ranked previously transmitted outbound signaling messages, may be assigned a higher priority than new outbound signaling messages that are of a similar type as relatively lower ranked previously transmitted outbound signaling messages.

The computing device may the adjust the queue structure and/or a message sequence on a control channel such that repeats of relatively higher priority outbound signaling messages increase and/or repeats of relatively lower priority outbound signaling messages decrease and/or are offloaded to a communication path different from the control channel.

The computing device may include, but is not limited to, a fixed network enterprise (FNE) device and/or a communication infrastructure device and/or a cloud computing device and/or a base station device, and the like. The edge devices may include mobile devices and/or portable devices and/or subscriber devices of the same network of which the computing device is a component and/or the edge devices may be roaming to the network.

An aspect of the specification provides method comprising: receiving, at a computing device managing outbound signaling messages on one or more control channels, from one or more edge devices receiving the outbound signaling messages on the one or more control channels, rankings of previously transmitted outbound signaling messages; adjusting, at the computing device, one or more of a queue structure and a message sequence of the outbound signaling messages based on the rankings; and transmitting, from the computing device, to the one or more edge devices, the outbound signaling messages according to one or more of the queue structure and the message sequence, as adjusted.

Another aspect of the present specification provides a device comprising: a communication unit; and a controller communicatively coupled to the communication unit, the controller configured to: receive, via the communication unit, from one or more edge devices receiving outbound signaling messages on one or more control channels, rankings of previously transmitted outbound signaling messages; adjust one or more of a queue structure and a message sequence of the outbound signaling messages based on the rankings; and transmit, via the communication unit, to the one or more edge devices, the outbound signaling messages according to one or more of the queue structure and the message sequence, as adjusted.

Each of the above-mentioned examples will be discussed in more detail below, starting with example system and device architectures of the system in which the embodiments may be practiced, followed by an illustration of processing blocks for achieving an improved technical method, device, and system for dynamically adjusting a queue structure and message sequencing Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts a system 100 for dynamically adjusting a queue structure and message sequencing. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

While present examples are described with respect to a computing device and mobile devices and/or edge devices associated with a public-safety entity (e.g., such as a police department, and the like), computing devices and edge devices associated with other types of entities, and/or consumer computing devices and/or edge devices, may leverage a same or similar technique as described herein. For example, computing devices and/or edge devices associated with a warehousing entity, a construction entity, a service industry entity, and/or a consumer entity, such as a consumer and/or commercial network provider, and the like, may implement same and/or similar techniques as described herein.

Herein, the terms "traffic" and/or "messages" are understood to refer to messages exchanged on communication channels and/or talkgroups between edge devices and/or mobile devices. In contrast, the terms "signaling messages" and/or "outbound signaling messages" are understood to refer to control messages, and the like, transmitted from a site, to the edge devices and/or mobile devices, on a control channel, which generally control scheduling of time slots and/or signaling for transmission of the traffic and/or messages exchanged on the communication channels and/or the talkgroups between edge devices and/or mobile devices, and the like (e.g. outbound signaling messages are understood to be outbound from a site and/or base station to edge devices and/or mobile devices). Similarly, "inbound signaling messages" are understood to refer to control messages, and the like, transmitted from edge devices and/or mobile devices to a base station, on a control channel, which generally request time slots for transmitting voice data and/or data traffic and the like (e.g. inbound signaling messages are understood to be inbound to a site and/or base station from edge devices and/or mobile devices).

Similarly, the term "control channel" as used herein is understood to be a communication channel on which the signaling messages (e.g. outbound and/or inbound signaling messages) are transmitted, which may be similar to, or different from, the communication channels and/or talkgroups on which traffic and/or messages are exchanged between edge devices and/or mobile devices.

Hence, edge devices and/or mobile devices described herein are understood to communicate via channels and/or communication channels, including, but not limited to, talkgroups. Indeed, the term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP (Voice-over-internet-protocol) communication path, a push-to-talk channel, and the like. Indeed, groups of channels may be logically organized into talkgroups, and/or dynamically allocated into talkgroups, though channels in a talkgroup may be dynamic as the traffic (e.g. communications) in a talkgroup may increase or decrease, and channels assigned to the talkgroup may be adjusted accordingly. Hence, calls and/or communications and/or traffic herein may include, but are not limited to, push-to-talk (PTT) calls, VOIP calls, cell phone calls, and the like.

The system 100 is next described in detail.

The system 100 comprises a computing device 101 configured to manage outbound signaling messages on one or more control channels. For example, as depicted the system 100 comprises a site and/or base station 103 (e.g. including, but not limited to, a cellular site and/or base station and/or eNodeB site) that includes a wireless antenna 105 and a queue device 107 that operates a signaling message queue 109 (interchangeably referred to hereafter as the queue 109). The queue device 107 generally generates and transmits outbound signaling messages 111 (interchangeably referred to hereafter as the signaling messages 111) on a control channel 113 (e.g. which may include, one or more control channels) by sequencing the signaling messages 111 into the queue 109 which may include, but is not limited to, sequencing repeats of the signaling messages 111 in the queue 109. The queue device 107 may implement any other suitable functionality of the base station 103; for example, the queue device 107 may generally comprise a computing device which manages and/or performs any suitable functionality of the base station 103, including, but not limited to, sequencing the signaling messages 111 into the queue 109, managing traffic between edge devices of the system 100, amongst other possibilities.

In general, the computing device 101 may comprise one or more servers and/or one or more cloud computing devices, one or more FNE devices and/or a communication infrastructure device and/or one or more cloud computing devices and/or one or more base station devices, and the like. In particular examples, the computing device 101 may be combined with the queue device 107 such that the computing device 101 is located at the base station 103. However, the computing device 101 may be in communication with a plurality of sites and/or base stations, including, but not limited to, the base station 103, and manage respective queues thereof. Regardless, it is understood that computing device 101 generally manages outbound signaling messages on one or more control channels, including, but not limited to, the control channel 113.

The system 100 further comprises a plurality of edge devices 115-1, 115-2 . . . 115-N, (interchangeably referred to hereafter, collectively, as the edge devices 115 and, generically, as an edge device 115; this convention will be used throughout the present specification).

The queue device 107 generally transmits the signaling messages 111 to the edge devices 115 on the control channel 113 based on the structure of the queue 109, described in more detail below with respect to FIG. 4 and FIG. 5. While not depicted, the edge devices 115 may transmit inbound signaling messages on the control channel 113 (e.g. and/or another control channel) to the base station 103, for example based on a time slot schedule transmitted via the signaling messages 111.

While not depicted, the edge devices 115 further communicate via channels, for example to transmit voice traffic and/or data traffic, and/or any other suitable traffic, to each other (e.g. and/or other edge devices 115 at other sites and/or base stations). In general, the signaling messages 111 control scheduling for traffic and/or time slots, and the like, of data exchanged between the edge devices 115 on the channels.

While three edge devices 115 are depicted (e.g. "N"=3), the system 100 may comprise as few as two edge devices 115 and/or as many as tens to hundred to thousands of edge devices 115, which may be communicating on channels and/or talkgroups via the base station 103, and/or other base stations in wired and/or wireless communication with the base station 103. In particular the control channel 113 and communication channels are understood to comprise wireless channels of a wireless communication network, the base station 103 may be a component of such a network.

As depicted, the edge devices 115 may include mobile devices and/or portable devices and/or subscriber devices associated with a same network of which the base station 103 is a component (e.g. one or more the edge devices 115 may not be roaming), and/or one or more of the edge devices 115 may be roaming to such a network. In some examples, an edge device 115 may comprise a vehicle communication device (e.g. a radio installed in a vehicle), while in other examples an edge device 115 may comprise a communication fixed device, including, but not limited to, a dispatch radio operated by a dispatcher dispatching first responders to incidents.

Furthermore, while not depicted, one or more of the edge devices 115 may be operated by public safety personnel and/or first responders, such as police officers, firefighters, emergency medical technician, and the like; in these examples, the edge devices 115 may be communicating on a network dedicated to public safety personnel (e.g. such as a P25 network and/or a TDMA network, and the like) and/or a consumer and/or commercial network (e.g. such as a commercial broadband network). However, in other examples, or more of the edge devices 115 may be operated by employees of commercial entities and/or consumers, and communicating on a network operated by such commercial entities, and/or a consumer and/or commercial network.

In yet further examples, the edge devices 115 and/or the computing device 101 may be configured to communicate on more than one type of network; for example, the edge devices 115 and/or the computing device 101 may be communicating on a network dedicated to public safety personnel (e.g. such as a P25 network, of which the base station 103 is a component), and on broadband networks (e.g. via other base stations, not depicted and/or the base station 103 may include components for communicating on more than one type of network). Hence, the edge devices 115 and/or the computing device 101 (and alternatively the base station 103) may be configured to communicate via different communication paths (e.g. which are understood to include, but are not limited to, communication links on different networks).

In some examples, an edge device 115 may have specific functionality that limits certain types of traffic and/or an edge device 115 may be dedicated and/or primary dedicated, to certain types of traffic. For example, one or more of the edge devices 115 may be primarily for voice traffic, such as dedicated PTT radios, and the like. Similarly, one or more of the edge devices 115 may be primarily for data traffic, such as a messaging device and/or a pager, and the like.

Furthermore, a number of edge devices 115 in the system 100 may change over time and/or types of traffic being exchanged on the channels between the edge devices 115 may change over time. For example, a public-safety incident, such a car accident, and the like, may occur and first responders operating the edge devices 115 may coordinate a response to the public-safety incident by exchanging voice traffic using the edge devices 115, causing an increase in voice traffic. Hence, a structure of the queue 109 and/or a sequence of signaling messages 111 in the queue 109 may not be suitable for such a change in traffic.

Hence, as depicted, the edge devices 115 comprise respective ranking engines 117-1, 117-2 . . . 117-N (e.g. ranking engines 117 and/or a ranking engine 117) which rank signaling messages 111 received at the edge devices 115 and provides such rankings 119 to the computing device 101, for example via any suitable communication link and/or communication channel 121. While only one group of rankings 119 is depicted in FIG. 1, it is understood that the edge devices 115 generate and transmit respective rankings 119. While for simplicity the communication channel 121 is depicted as being between the edge devices 115 and the computing device 101, it is understood that the communication channel 121 may be via the base station 103 and may include, but is not limited to, the control channel 113, another channel operated the base station 103 and/or a communication path different from channels operated by the base station 103.

The term engines, as used herein is understood to include a combination of hardware and software which implements a given functionality. For example, the ranking engines 117 may comprise a combination of a hardware processor and/or controller of a respective edge device 115 which ranks the signaling messages 111 and provides such rankings 119 to the computing device 101.

Hence, the edge devices 115 are generally configured to receive and rank the signaling messages 111, and provide and/or transmit such rankings 119 (e.g. via the ranking engines 117) to the computing device 101, for example via the communication channel 121.

In general, ranking engines 117 may generate the rankings 119 by ranking the signaling messages 111 according to one or more of usefulness and effectiveness thereof.

For example, usefulness may be understood herein as a rating and/or a value and/or an indicator that indicates whether, or not, an edge device 115 undergoes a change in state due to a received outbound signaling message 111, and/or whether, or not, an edge device 115 uses data from an outbound signaling message 111.

In a particular example, a given signaling message 111 may be to provide an identifier of channel on which a given edge device 115 is going to transmit a PTT voice message, and other given signaling messages 111 may repeat the same information. When other edge devices 115 first receive the given signaling message 111, respective ranking engines 117 may rank the given signaling message 111 as being useful, for example according to any numerical ranking scheme, including, but not limited to, a numerical ranking scheme that rates signaling messages 111 on a scale of 1 to 10, and the like. However, when repeats of the given signaling message 111 are received at the other edge devices 115, the respective ranking engines 117 may rank the repeats of the given signaling message 111 as being less useful. Hence, for example, the given signaling message 111 may be initially ranked as "10" on a scale of 1 to 10, and repeats of the given signaling message 111 may be ranked lower than "10" on such a scale; the usefulness of repeats of the given signaling message 111 may decrease as a number of received repeats of the given signaling message increases.

In another examples, given signaling messages 111 may comprise identifier signaling messages 111 (e.g. "IDEN" signaling message types of a TDMA network), and repeats thereof, which identifies a network of which the base station 103 is a component. A ranking engine 117 of a roaming edge device 115, initially receiving such an identifier signaling message 111 may rank the identifier signaling message 111 as relatively high with respect to usefulness, as the roaming edge device 115 may use an initially received identifier signaling message 111 to register with the network; however, as repeats of an identifier signaling messages 111 are received, a ranking engine 117 of a roaming edge device 115 may rank such repeats as relatively lower. Similarly, ranking engines 117 of non-roaming edge devices 115, which have previously registered with the network may rank identifier signaling messages 111 as relatively lower with respect to usefulness.

Effectiveness may be understood herein as a rating and/or a value and/or an indicator that indicates timeliness of a received outbound signaling message 111 and/or a lateness, and the like, of a received outbound signaling message 111, and the like.

In a particular example, a first edge device 115 may request a time slot for a call to transmit voice traffic (e.g. via a request to "call" other edge devices 115 using an inbound signaling message transmitted to the base station 103 on the control channel 113, for example when a PTT button at the edge device 115 is actuated), and a call grant signaling message 111 may grant such a call request. In one example, the call grant signaling message 111 may comprise an identifier of the first edge device 115 that requested the call, as well as a schedule for the time slot for the call. The call grant signaling message 111 is understood to be received by other edge devices 115 so that they may receive voice traffic from the edge device 115 in the time slot on the call. However, there may be a delay in receiving the call grant signaling message 111 at a second edge device 115 (e.g. different from the first edge device 115), such that the second edge device 115 joins the "call" late. As such, a ranking engine 117 at the second edge device 115 may rank the call grant signaling message 111 as being relatively low with respect to effectiveness, again according to any suitable ranking system. However, the second edge device 115 may rank the call grant signaling message 111 as being relatively high with respect to usefulness.

Hence, a given signaling message 111 may be ranked by a ranking engine 117 according to usefulness and/or effectiveness, and/or according to a weighting scheme which combines such rankings. For example, a late received call grant signaling message 111 may be ranked high for usefulness but low for effectiveness, but the usefulness ranking may be higher weighted than the effectiveness ranking (e.g. a usefulness rating for a given signaling message 111 may be weighted at 75%, and an effectiveness rating for the given signaling message 111 may be weighted at 25%, amongst other possibilities). Hence, in these examples, a ranking 119 for a given signaling message 111 may comprise a combined weighted ranking as to usefulness and effectiveness thereof.

However a ranking 119 for a given signaling message 111 may comprise a combination that includes both a usefulness ranking and an effectiveness ranking (e.g. distinct from each other).

Regardless, the computing device 101 receives the rankings 119 according to any suitable scheme implemented by the ranking engines 117 and the computing device 101 is generally configured to process and/or analyze the rankings 119 according to a same and/or similar scheme.

Regardless, the computing device 101 receives the rankings 119 (e.g. which are understood to be rankings of previously transmitted outbound signaling messages 111) and adjusts the queue 109 based on the rankings 119, as described in more detail below.

Figure 2:
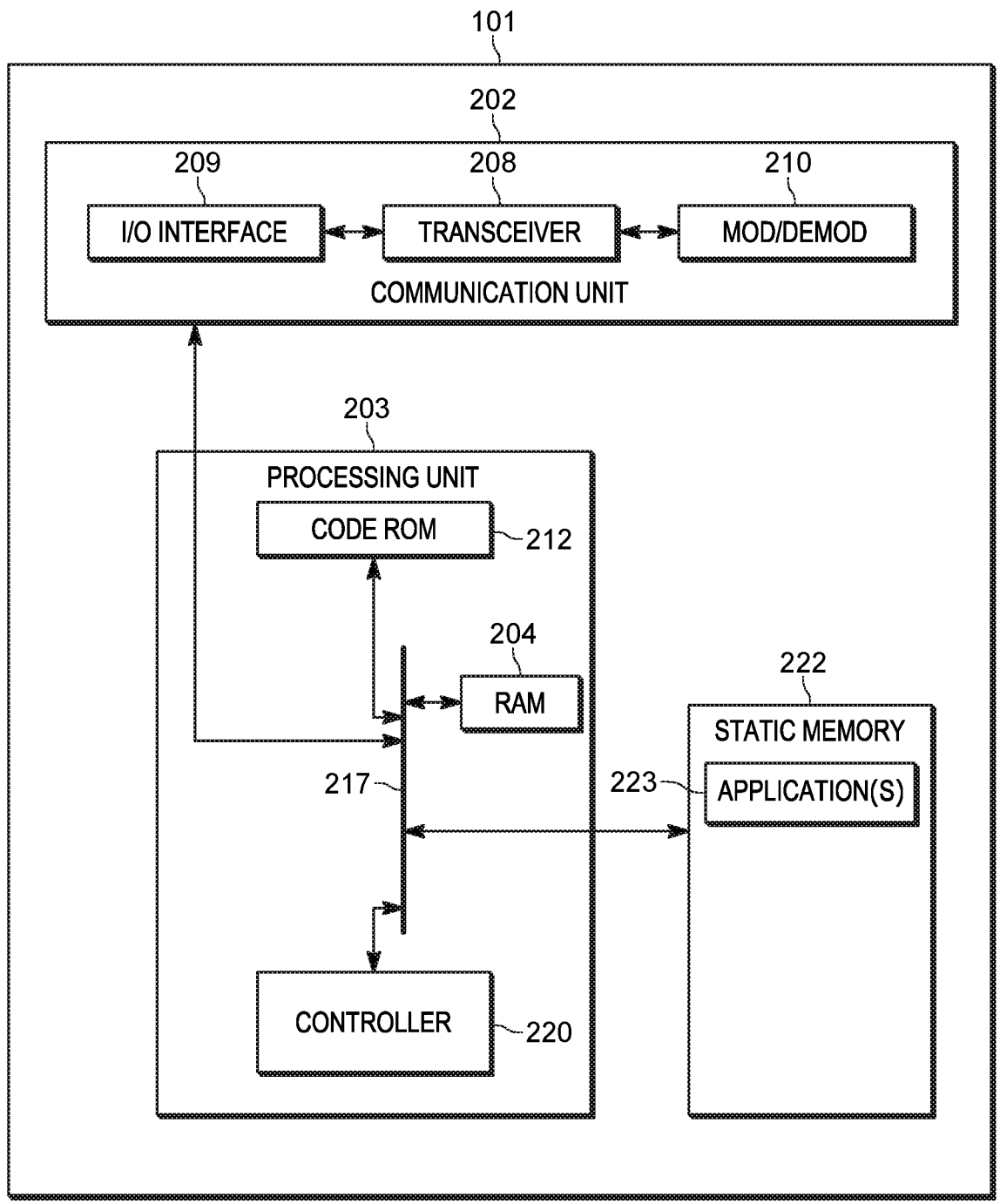
FIG. 2 depicts example communication devices in according with some embodiments.

Attention is next directed to FIG. 2, which depicts a schematic block diagram of an example of the computing device 101. As has already been mentioned, in general, the computing device 101 may comprise one or more servers and/or one or more cloud computing devices, one or more FNE devices and/or a communication infrastructure device and/or one or more cloud computing devices and/or one or more base station devices, and the like. In particular examples, the computing device 101 may be combined with the queue device 107 such that the computing device 101 is located at the base station 103. However, the computing device 101 may be in communication with a plurality of sites and/or base stations, including, but not limited to, the base station 103, and manage respective queues thereof. Regardless, it is understood that computing device 101 generally manages outbound signaling messages on one or more control channels, including, but not limited to, the control channel 113.

As depicted, the computing device 101 comprises: a communication unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223.

While not depicted, the computing device 101 may include one or more of an input device and a display screen and the like, a microphone (e.g., to receive voice commands) such that a user (e.g., an administrator of the system 100), may interact with the computing device 101. The computing device 101 may include any other suitable components.

As shown in FIG. 2, the computing device 101 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with the base station 103, the queue device 107, and/or the edge devices 115. For example, the communication unit 202 may include one or more transceivers 208 and/or wireless transceivers for communicating with the base station 103, the queue device 107, and/or the edge devices 115, and/or any other suitable component of the system 100. Hence, the one or more transceivers 208 may be adapted for communication with one or more communication networks used to communicate with the base station 103, the queue device 107, and/or the edge devices 115, and/or any other suitable component of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g., hardware ports) for coupling to other hardware components.

The controller 220 may include one or more logic circuits, one or more processors, one or more microprocessors, and/or the controller 220 may include one or more ASIC (application-specific integrated circuits) and one or more FPGA (field-programmable gate arrays), and/or another electronic device. In some examples, the controller 220 and/or the computing device 101 is not a generic controller and/or a generic device, but a device specifically configured to implement functionality for dynamically adjusting a queue structure and message sequencing. For example, in some examples, the computing device 101 and/or the controller 220 specifically comprises a computer executable engine configured to implement functionality for dynamically adjusting a queue structure and message sequencing.

The static memory 222 is a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functional teachings of the computing device 101 as described herein are maintained, persistently, at the memory 222 and used by the controller 220, which makes appropriate utilization of volatile storage during the execution of such programming instructions.

Figure 3:
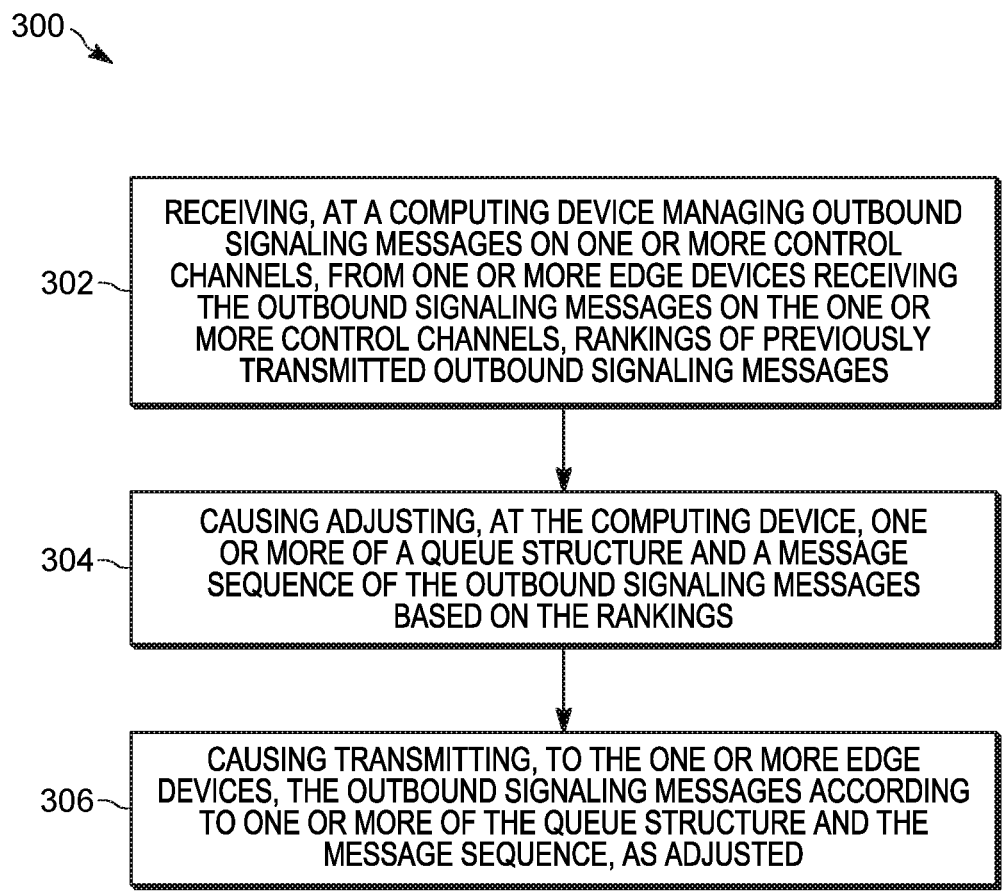
FIG. 3 is a flowchart of a method for dynamically adjusting a queue structure and message sequencing in accordance with some examples.

In particular, the memory 222 stores instructions corresponding to the at least one application 223 that, when executed by the controller 220, enables the controller 220 to implement functionality described herein including, but not limited to, the blocks of the method set forth in FIG. 3.

In illustrated examples, when the controller 220 executes the one or more applications 223, the controller 220 is enabled to: receive, from one or more edge devices receiving outbound signaling messages on one or more control channels, rankings of previously transmitted outbound signaling messages; adjust one or more of a queue structure and a message sequence of the outbound signaling messages based on the rankings; and transmit (and/or cause transmitting) to the one or more edge devices, the outbound signaling messages according to one or more of the queue structure and the message sequence, as adjusted.

The application 223 may include numerical algorithms configured to implement the functionality as described above and/or determine how to adjust one or more of a queue structure and a message sequence of outbound signaling messages based on rankings.

Alternatively, and/or in addition to numerical algorithms, the application 223 may include machine learning models and/or algorithms, and the like, which have been trained to implement the functionality as described above and/or determine how to adjust one or more of a queue structure and a message sequence of outbound signaling messages based on rankings. In some of these examples, the application 223 may be operated by the controller 220 in a learning mode to receive feedback on how adjustments of one or more of a queue structure and a message sequence of outbound signaling messages affected rankings, to improve, for example, usefulness and/or effectiveness of outbound signaling messages.

The one or more machine learning models and/or algorithms of the application 223 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments. Any suitable machine learning algorithm and/or deep learning algorithm and/or neural network is within the scope of present examples.

While details of the edge devices 115 are not depicted, the edge devices 115 may have components similar to the computing device 101 as depicted in FIG. 2 adapted, however, for the functionality thereof. For example, the edge devices 115 may include respective display screens, input devices, speakers, microphones, clocks, radio frequency signal strength measurement devices, and the like as well as the aforementioned ranking engines 117. Indeed, the ranking engines 117 may also be implemented via numerical algorithms and/or machine learning algorithms that have been trained to rank signaling messages, for example according to usefulness and/or effectiveness as described above; such machine learning algorithms may also be operated in a learning mode. Regardless, it is understood that the edge devices 115 include respective transceivers for communicating via channels and control channels, as described herein.

Attention is now directed to FIG. 3, which depicts a flowchart representative of a method 300 for dynamically adjusting a queue structure and message sequencing. The operations of the method 300 of FIG. 3 correspond to machine readable instructions that are executed by the computing device 101, and specifically the controller 220 of the computing device 101. In the illustrated example, the instructions represented by the blocks of FIG. 3 are stored at the memory 222 for example, as the application 223. The method 300 of FIG. 3 is one way that the controller 220 and/or the computing device 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, as has already been mentioned, components of the method 300 are referred to herein as "blocks" rather than "steps." The method 300 of FIG. 3 may be implemented on variations of the system 100 of FIG. 1, as well.

At a block 302, the controller 220 and/or the computing device 101 receives, from one or more edge devices 115 that receive outbound signaling messages 111 on one or more control channels (e.g. the control channel 113), rankings 119 of previously transmitted outbound signaling messages 111.

The rankings 119 may have any suitable format that indicates, for example, types and associated usefulness and/or effectiveness of signaling messages 111. For example, a ranking 119 for a given signaling message 111 received from a given edge device 115 may indicate a type of the given signaling message 111 (e.g. a call grant signaling message) and/or information included in the given signaling message 111 and the like.

Such a ranking 119 may further include, but is not limited to: a time that the given signaling message 111 was received at the given edge device 115; an identifier of the site and/or base station 103 from which the given signaling message 111 was received; radio frequency (RF) conditions (e.g. a signal strength of the control channel 113 and the like) associated with and/or at the given edge device 115 (presuming that the given edge device 115 includes hardware for determining and/or measuring such RF conditions); identifiers of channels and/or talkgroups, and the like, associated with the given edge device 115 (e.g. on which the given edge device 115 is registered to communicate); an indicator of whether the given signaling message 111 failed (e.g. a given scheduled action and/or was ignored, described in more detail below); and the like. In particular, the ranking engines 117 may be configured to include such information in the rankings 119.

In specific examples, the rankings 119 may include, but are not limited to:

A count of a number of repeats and/or retries of a given signaling message 111; for example, a number of repeats of a given signaling message 111 that were received prior to a respective action being implemented at a given edge device 115 (e.g. the term "retry" be interchangeable with the term "repeat").

Whether a number of repeats of a given signaling message 111 was exhausted. For example, a number of repeats of a given signaling message 111 may be limited to a given number and when the number of repeats reaches the given number, and a respective action is still not implemented at a given edge device 115, the number of repeats may be referred to as being exhausted and/or the signaling message 111 may be referred to as having failed.

A lateness of a given signaling message 111, as described above, including, but not limited to, any suitable time periods that indicate such a lateness.

Whether or not a given signaling message 111 caused a "bonk" at a given edge device 115, which may be related to the lateness and/or a number of repeats of a given signaling message 111. For example a "bonk" may be understood as noise and/or audible feedback generated via a speaker of an edge device 115 indicating that a request associated with a given signaling message 111 failed and/or was not responded to in a timely manner, and/or otherwise indicating an error when attempting to transmit traffic using an edge device 115, and the like.

Indeed, a ranking 119 may include any other suitable information which may include, but is not limited to, whether a given signaling message 111 is out of range (e.g. a value in a given signaling message 111 is not processable by an edge device 115), an associated decode failure, an associated false recovery, an associated bit error rate, and the like.

Furthermore, the rankings 119 may be received periodically and/or upon request by the computing device 101 and/or according to any other suitable schedule. Furthermore, the rankings 119 may be received one-to-one with respective signaling messages 111 (e.g. such that one ranking 119 is generated and transmitted for a given signal message 111) and/or the rankings 119 may comprise groups of rankings of signal messages 111.

At a block 304, the controller 220 and/or the computing device 101 adjusts and/or causes adjusting of one or more of a queue structure and a message sequence of the outbound signaling messages 111 based on the rankings 119.

For example, as described above, the rankings 119, received from the one or more edge devices 115, rank the previously transmitted outbound signaling messages 111 (e.g. received at the one or more edge devices 115) according to one or more of usefulness and effectiveness thereof.

While specific examples for generating rankings 119 of certain types signaling messages 111 have been previously described, the rankings 119 may include rankings of any suitable signaling messages 111.

For example, the rankings 119 may include, but are not limited to a usefulness ranking for a given previously transmitted outbound signaling message 111 defining one or more of (amongst other possibilities):

How useful the given previously transmitted outbound signaling message 111 was to an edge device 115 for controlling behavior thereof. For example, as described above an initially received signaling message 111 of a given type and/or including given information may be more useful than a repeated signaling message 111 of the same type and/or including the same information. Hence, in general, the usefulness of a given previously transmitted outbound signaling message 111 may be determined based on whether, or not, the given previously transmitted outbound signaling message 111 changes behavior, or not, at an edge device 115. For example, a given previously transmitted outbound signaling message 111 that changes behavior of an edge device 115 may be assigned a higher usefulness ranking than a signaling message 111 that does not change behavior of an edge device 115 and/or maintains a behavior of an edge device 115 and/or is ignored by the edge device 115 as being irrelevant.

Whether the given previously transmitted outbound signaling message 111 was a repeat of another previously transmitted outbound signaling message 111. Such examples were previously described and may further be related to whether, or not, a repeat of another previously transmitted outbound signaling message 111 changes behavior of an edge device 115.

Whether the given previously transmitted outbound signaling message 111 was a data signaling message 111 received by a data edge device 115 or a voice edge device 115. For example, as previously described, an edge device 115 may be primarily for voice traffic or data traffic, and hence a data signaling message 111 (e.g. for scheduling a time slot to transmit or received data, such as text messages, pager messages, and/or locations of the edge device 115 and/or any other suitable data) may be assigned a lower usefulness rating by a voice edge device 115 than by a data edge device 115.

Whether the given previously transmitted outbound signaling message 111 was a voice signaling message received by a data edge device 115 or a voice edge device 115. For example, as previously described, an edge device 115 may be primarily for voice traffic or data traffic, and hence a voice signaling message 111 (e.g. for scheduling a time slot to transmit voice traffic, such PTT calls, and the like) may be assigned a lower usefulness rating by a data edge device 115 than by a voice edge device 115.

Similarly, the rankings 119 may include, but are not limited to an effectiveness ranking defining how effective a given previously transmitted outbound signaling message 111 was for controlling timely behavior an edge device 115.

An example of an effectiveness ranking for call grant signaling messages 111 was previously described, however an effectiveness ranking may be determined for other types of signaling messages 111.

For example, an edge device 115 may transmit, to the base station 103, an inbound signaling message requesting a time slot, and the like, for performing any suitable action on a communication channel and/or talkgroup, and a corresponding outbound signaling message 111 granting the request may arrive "late" from the base station 103, such that, prior to the edge device 115 receiving the corresponding outbound signaling message 111, the edge device 115 transmit a repeat of the inbound signaling message requesting a time slot for performing the action. Such a repeat and/or late receipt of the corresponding signaling message 111 may cause a bonk to occur at the edge device 115 (e.g. a noise generated indicating that an initial request failed) and/or a relatively late performance of the action. In these examples, the corresponding outbound signaling message 111 arriving late (e.g. as determined by a bonk occurring and/or by a repeat transmission of an inbound signaling message from the edge device 115 to the base station 103 requesting a time slot for performing the action) may be ranked relatively lower than outbound signaling messages 111 which are not received late (e.g. which do not cause a bonk and/or a repeat transmission of an inbound signaling message).

Indeed, one or more of a bonk, a "late" call grant signaling message 111, a late join to a call, and the like, may cause a ranking engine 117 to lower an effectiveness ranking of a signaling message 111.

Regardless, the controller 220 and/or the computing device 101 receives the rankings 119 and causes a queue structure and/or a message sequence of the queue 109 to be adjusted accordingly.

For example, the controller 220 and/or the computing device 101 may adjust one or more of the queue structure and the message sequence of the outbound signaling messages 111 by adjusting one or more of:

A number of queues (e.g. sub-queues) in a queue structure of the queue 109. For example, the controller 220 and/or the computing device 101 may assign priorities to signaling messages 111 based on the rankings 119 as described in more detail below. Furthermore, the queue 109 may comprise a number of sub-queues into which signaling messages 111 of different priorities are sequenced, for example to transmit higher priority signaling messages 111 prior to lower priority signaling messages 111 and/or to increase or decrease numbers of repeats of the signaling messages 111. Hence, in these examples, a number of the queues and/or sub-queues of the queue 109 may be increased or decreased. In yet further examples, the number of the queues and/or sub-queues of the queue 109 may not change, but the queues and/or sub-queues of the queue 109 may be rearranged.

Transitions between the queues (e.g. sub-queues) in a queue structure of the queue 109. For example, as described below, such transitions may be used to control numbers of repeats of the signaling messages 111. Hence, to increase numbers of repeats of certain, signaling messages 111, more transitions may be added between certain queues (e.g. sub-queues) in a queue structure of the queue 109; similarly, to decrease numbers of repeats of certain, signaling messages 111, transitions may be reduced between certain queues (e.g. sub-queues) in a queue structure of the queue 109. In yet further examples, a number of the transitions of the queue 109 may not change, but the transitions of the queue 109 may be rearranged.

Repeats of the outbound signaling messages 111 in the queue structure of the queue 109. For example, the controller 220 and/or the computing device 101 may assign priorities to signaling messages 111 based on the rankings 119 and cause repeats of higher priority signaling messages 111 to increase and further cause repeats of lower priority signaling messages 111 to decrease.

Positions of given outbound signaling messages 111 in the queue structure of the queue 109. For example, as mentioned above, the controller 220 and/or the computing device 101 may assign priorities to signaling messages 111 based on the rankings 119 and adjust positions of higher priority signaling messages 111 to change relative to lower priority signaling messages 111 such that the higher priority signaling messages 111 are transmitted prior to the lower priority signaling messages 111.

However, the controller 220 and/or the computing device 101 may adjust one or more of the queue structure and the message sequence of the outbound signaling messages 111 by adjusting any suitable aspect of the queue 109 and the like.

As mentioned above, the controller 220 and/or the computing device 101 may assign priorities to signaling messages 111 based on the rankings 119. For example, the rankings 119 of certain previous signaling messages 111 may indicate a relatively low usefulness ranking; hence, the controller 220 and/or the computing device 101 may assign a relatively low priority to same and/or similar signaling messages 111 (e.g. of a same and/or similar type and/or including same and/or similar information as previous signaling messages 111 having a relatively low usefulness ranking). Similarly, the rankings 119 of other previous signaling messages 111 may indicate a relatively high usefulness ranking; hence, the controller 220 and/or the computing device 101 may assign a relatively high priority to same and/or similar signaling messages 111 (e.g. of a same and/or similar type and/or including same and/or similar information as previous signaling messages 111 having a relatively high usefulness ranking).

Similarly, the rankings 119 of certain previous signaling messages 111 may indicate a relatively low effectiveness ranking; hence, the controller 220 and/or the computing device 101 may assign a relatively high priority to same and/or similar signaling messages 111 (e.g. of a same and/or similar type and/or including same and/or similar information as previous signaling messages 111 having a relatively low effectiveness ranking) for example to improve their effectiveness. Similarly, the rankings 119 of other previous signaling messages 111 may indicate a relatively high effectiveness ranking; hence, the controller 220 and/or the computing device 101 may assign a relatively higher priority to same and/or similar signaling messages 111 (e.g. of a same and/or similar type and/or including same and/or similar information as previous signaling messages 111 having a relatively high effectiveness ranking) to improve and/or maintain their effectiveness.

However, the controller 220 and/or the device 101 may assign priorities in any suitable manner to improve usefulness and/or effectiveness of signal messages 111 as indicated by the rankings 119. Similarly, the controller 220 and/or the device 101 may accordingly adjust one or more of the queue structure and the message sequence of the queue 109 may be adjusted to cause such higher and lower priority signaling messages 111 to be transmitted as described above.

For example, the controller 220 and/or the computing device 101 may generally adjust the queue 109 to reduce repeats of less useful signal messages 111, increase repeats of more useful signal messages 111, and/or generally improve usefulness of signal messages 111. Similarly, the controller 220 and/or the computing device 101 generally adjusts the queue 109 to reduce repeats less effective signal messages 111, increase repeats of more effective signal messages 111, and/or generally improve effectiveness of signal messages 111.

Hence, in general, the method 300 may further comprise the controller 220 and/or the device 101: determining respective priorities of outbound signaling messages 111; and adjusting one or more of a queue structure and a message sequence of the outbound signaling messages 111 to cause one or more of: repeats of higher priority outbound signaling messages 111 to increase; and respective repeats of lower priority outbound signaling messages 111 to one or more of: decrease; and be offloaded to a communication path different from the control channel 113. For example, repeats of lower priority outbound signaling messages 111 may be transmitted via a broadband network rather than on a P25 network, and the like.

In general, the controller 220 and/or the computing device 101 may adjust a queue structure and/or a message sequence of the queue 109 by transmitting a command to the queue device 107 indicating a changed queue structure and/or a changed message sequence of the queue 109, causing the queue device 107 to adjust the queue 109 accordingly. Alternatively, when the computing device 101 is combined with the queue device 107, the controller 220 and/or the computing device 101 may adjust a queue structure and/or a message sequence of the queue 109 accordingly.

An examples of queue structure and/or message sequence of the queue 109 before and after adjustment are described in more detail below with respect to FIG. 4 and FIG. 5.

At a block 306, the controller 220 and/or the computing device 101 transmits (and/or causes transmission of) the outbound signaling messages 111, to the one or more edge devices 115, according to one or more of the queue structure and the message sequence, as adjusted. For example, when the computing device 101 is remote and/or separate from the queue device 107 the outbound signaling messages 111 being transmitted according to one or more of the queue structure and the message sequence, as adjusted, may occur via the computing device 101 transmitting the aforementioned command to the queue device 107 such that that the queue device 107 sequences the signaling messages 111 in an adjusted queue structure of the queue 109 accordingly. Alternatively, when the computing device 101 is combined with the queue device 107, the computing device 101 may sequences the signaling messages 111 in an adjusted queue structure of the queue 109 accordingly.

The method 300 may be further adapted to correlate the rankings 119 with time. For example, the rankings 119 may indicate that the usefulness and/or effectiveness of given signaling messages 111 correlate with time. In particular, certain types of signaling messages 111 may be determined to be more or less useful and/or effective at certain times of day, for example as a type of traffic and/or numbers of edge devices 115 change with time and/or according to a time of day. Hence, adjusting one or more of the queue structure and the message sequence of the outbound signaling messages 111 may occur for given times, such that a first queue structure and/or first message sequence is used in a daytime (and/or during times associated with daytime), and a second queue structure and/or second message sequence is used in a nighttime (and/or during times associated with nighttime). For example, a number of edge devices 115 may increase in a region serviced by the base station 103 at night, and decrease during the day (e.g. due to police officers increasing patrolling of the region at night) and the queue structure and/or message sequence may be adjusted accordingly.

However, such correlations may occur between the rankings 119 and other factors and/or conditions. In particular, the method may further comprising correlating the rankings 119 with one or more of: time; sites with which the one or more edge devices 115 are communicating (e.g. the edge devices 115 may move between sites); locations of the one or more edge devices 115; radio-frequency conditions associated with the one or more edge devices 115; incidents associated with the one or more edge devices 115; talkgroups associated with the one or more edge devices 115; failures of previously transmitted outbound signaling messages 111; and the like. In these examples, adjusting one or more of the queue structure and the message sequence of the outbound signaling messages 111 may be further based on the rankings 119 as correlated with such factors.

As such, the computing device 101 may maintain a database, and the like, of given queue structures and/or messaging sequences that increased the rankings 119 when associated factors and/or conditions occurred in the system 100. For example, when a given set of radio-frequency conditions associated with the one or more edge devices 115 occurred in the system 100 (e.g. for a given site and/or base station), as determined from previously received rankings 119, a given queue structure and/or messaging sequence may have been determined to improve the rankings 119; hence, when same and/or similar radio-frequency conditions occur in the system 100 (e.g. for the given site and/or base station), the controller 220 and/or the computing device 101 may adjust the queue 109 according to the previously determined given queue structure and/or messaging sequence that previously improved the rankings 119.

Similarly, when the edge devices 115 are associated with first responders, such as police officers, the computing device 101 may have access to a database of incidents to which the police officers are currently responding, and/or the rankings 119 may include indicators of such incidents (e.g. when police officers operating the edge devices 115 are responding to a car accident, the rankings 119 may indicate same). Hence, when a given incident associated with the one or more edge devices 115 occurred in the system 100, a given queue structure and/or messaging sequence may have been determined to improve the rankings 119; hence, when a same and/or similar incident occurs in the system 100, the controller 220 and/or the computing device 101 may adjust the queue 109 according to the previously determined given queue structure and/or messaging sequence that previously improved the rankings 119.

Put another way, the controller 220 and/or the computing device 101 may "learn" which queue structures and/or messaging sequences of the queue 109 improve the rankings 119 under given conditions and adjust the queue structure and/or messaging sequence of the queue 109 accordingly when a given condition occurs.

Hence, while present examples are described with respect to adjusting a queue structure and/or a message sequence of outbound signaling messages based rankings 119 of previously transmitted outbound signaling messages 111, the ranking 119 received from the edge devices 115, it is understood that such rankings 119 may include, but are not limited to, previously received and/or historical rankings used to train one or more machine learning models and/or algorithms. Hence, it is understood that adjusting a queue structure and/or a message sequence of outbound signaling messages based the rankings 119 received from the edge devices 115, as described herein may include, but is not limited to, adjusting a queue structure and/or a message sequence of outbound signaling messages based on estimated and/or predicted rankings using historically learned rankings (e.g. for given times and/or given locations and/or given incident types) previously received from the edge devices 115.

For example, receiving the rankings 119 may occur well prior to adjusting one or more of a queue structure and a message sequence of the outbound signaling messages 111 based on the rankings 119, and the ranking 119 may be used to train one or more machine learning models and/or algorithms to adjust one or more of a queue structure and a message sequence of the outbound signaling messages 111. In these examples, the controller 220 and/or the computing device 101 may determine types of outbound signaling messages 111 for sequencing in the queue 109 and adjust the one or more of a queue structure of the queue 109 and/or a message sequence of the outbound signaling messages 111 using one or more machine learning models and/or algorithms that have been trained to implement such functionality using historically received rankings 119.

Regardless, the controller 220 and/or the computing device 101 may continue to adjust the queue structure and/or messaging sequence of the queue 109 based on the rankings 119 as described above. For example, when a given of time day occurs, the controller 220 and/or the computing device 101 may adjust the queue structure and/or messaging sequence of the queue 109 to a stored queue structure and/or messaging sequence associated with the time of day, and continue to adjust the queue structure and/or messaging sequence of the queue 109 based on the rankings 119.

In some examples, the computing device 101 may manage queues of more than one site and/or base station. Hence, in these examples, instance of the method 300 may be implemented concurrently, and the like to adjust queues at different sites and/or base stations. Put another way, the controller 220 and/or the computing device 101 may manages a plurality of respective queues for a plurality of sites and/or base stations, and adjusting one or more of a queue structure and a message sequence of outbound signaling messages 111 may occur for each of the plurality of respective queues for the plurality of sites and/or base stations as described above. Hence, in these examples the different behaviors of edge devices 115 in response to receiving signaling messages 111 from different base stations may cause respective queues of the base stations to be adjusted differently.

Put yet another way, adjusting one or more of a queue structure and a message sequence of outbound signaling messages, by the controller 220 and/or the computing device 101, may occur for one or more specific sites and/or base stations (e.g. including, but not limited to the base station 103), used by the one or more edge devices 115 and the computing device 101 to communicate on one or more control channels (e.g. including, but not limited to the control channel 113).

Figure 4:
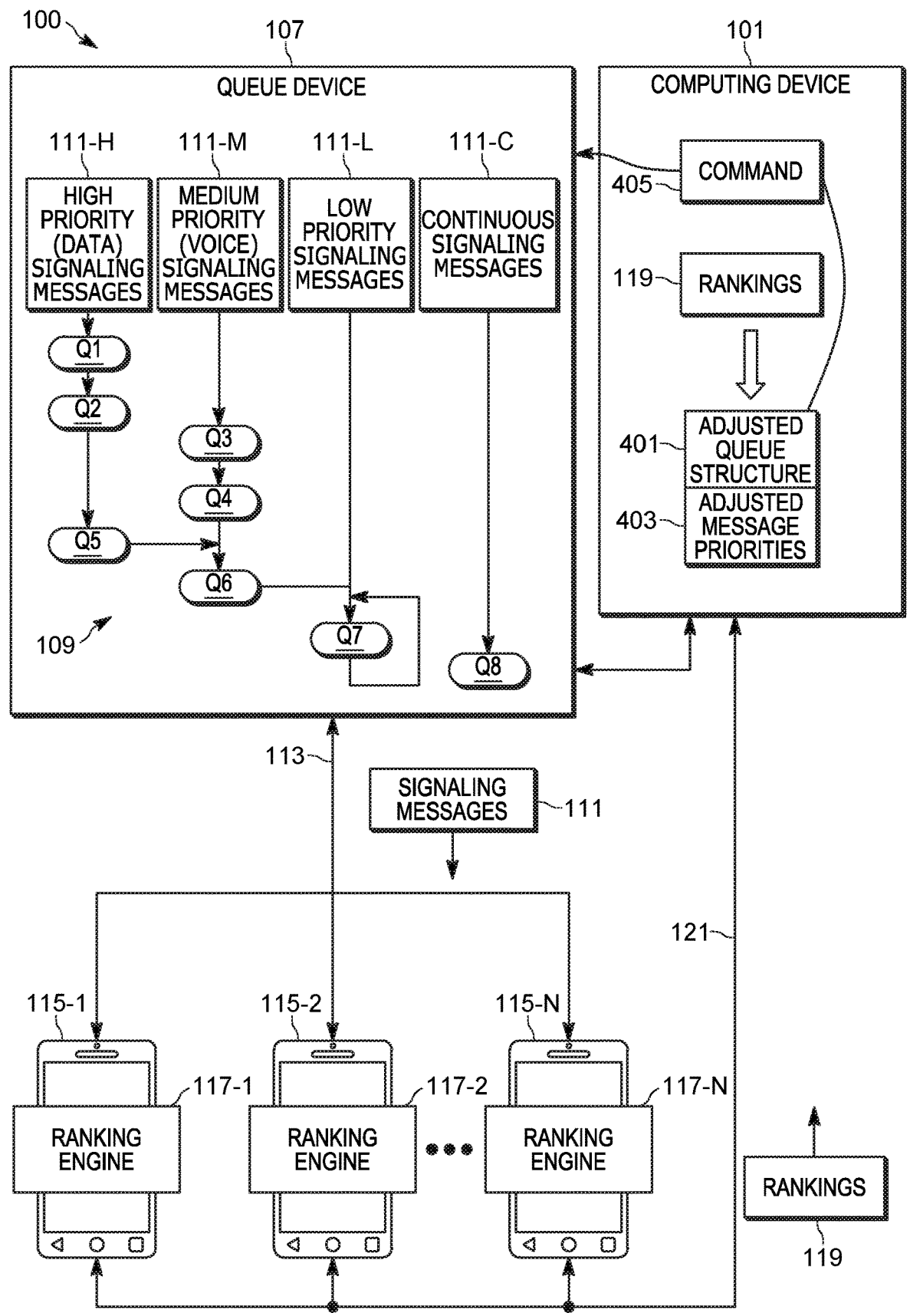
FIG. 4 depicts aspects of an example of a method for dynamically adjusting a queue structure and message sequencing implemented in the system of FIG. 1.
Figure 5:
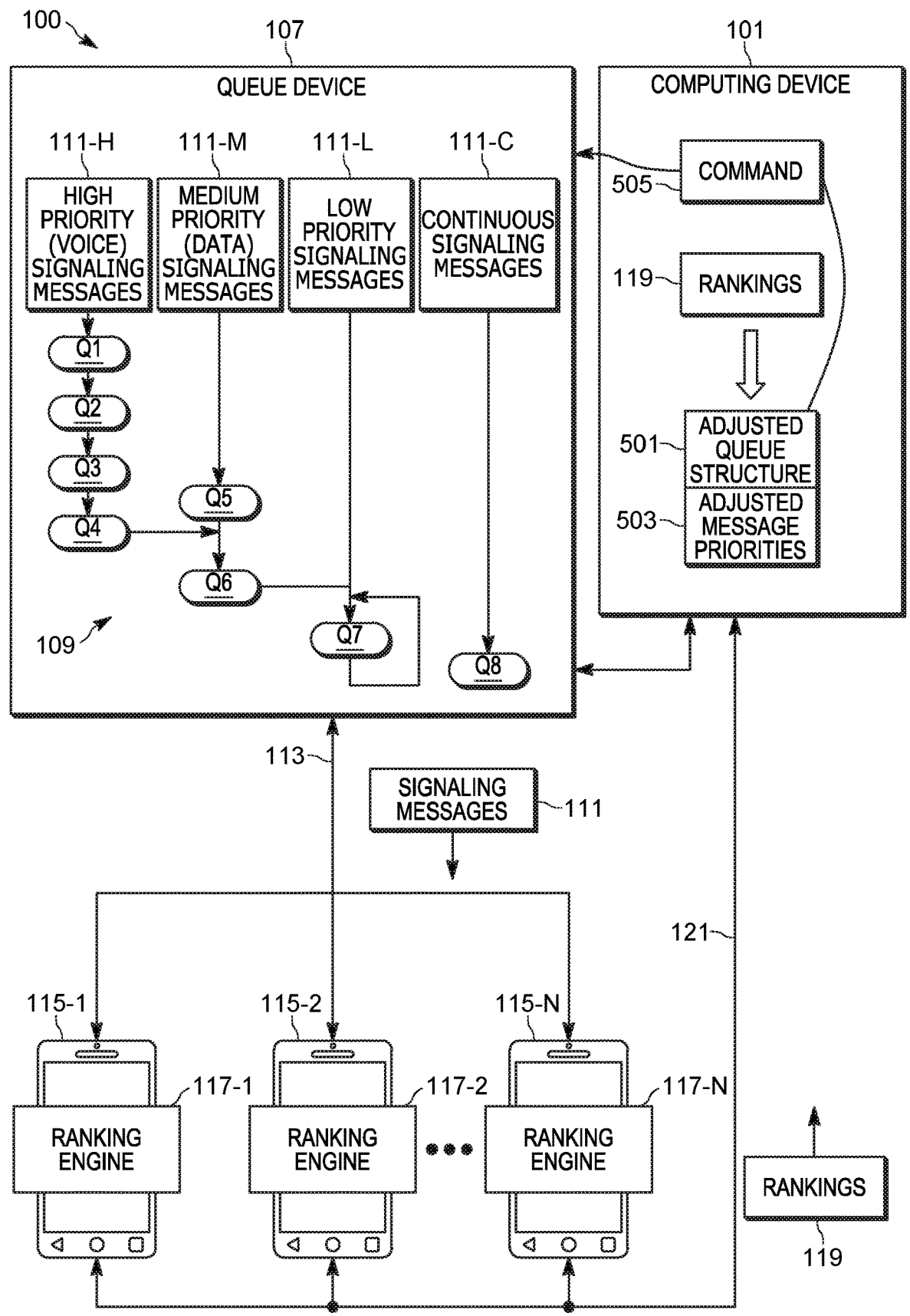
FIG. 5 depicts further aspects of an example of a method for dynamically adjusting a queue structure and message sequencing implemented in the system of FIG. 1.

An example of the method 300 is next described with respect to FIG. 4 and FIG. 5 which are substantially similar to FIG. 1 with like components having like numbers. While for simplicity the wireless antenna 105 is not depicted in FIG. 4 and FIG. 5, it is nonetheless understood to be present.

With attention first directed to FIG. 4, details of the queue 109 at the queue device 107 are depicted, for example prior to being adjusted by the computing device 101 based on the rankings 119.

In particular, the queue 109 is understood to include a plurality of queues and/or sub-queues Q1, Q2, Q3, Q4, Q5, Q6, Q7, and Q8 (referred to hereafter as the sub-queues) arranged in a particular structure as described below; the structure may be selected based on time of day, and/or other factors described herein. Furthermore a plurality of signaling messages 111 are depicted as being sequenced at the queue 109, for example to a given priority thereof. For example, as depicted, data signaling messages 111 have a relatively highest priority, voice signaling messages 111 have a relatively medium priority, and other types of signaling messages 111 are either of a relatively low priority (e.g. identifier signaling messages) or classified as being "continuous" which may control general management of the messages between the edge devices 115 and may not be specifically associated with data and/or voice etc. As such, as depicted in FIG. 4, the signaling messages 111 comprise high priority signaling messages 111-H for controlling data traffic, medium priority signaling messages 111-M for controlling voice traffic, low priority signaling messages 111-L for controlling other types of traffic, and continuous signaling messages 111-C for general management of traffic, and the like.

Furthermore, the high priority signaling messages 111-H are sequenced at the sub-queue Q1, and transmitted on the control channel 113, and then the high priority signaling messages 111-H are again sequenced at the sub-queue Q2, and again transmitted on the control channel 113 (e.g. to repeat their transmission).

The medium priority signaling messages 111-M are sequenced at the sub-queue Q3, and transmitted on the control channel 113 after the high priority signaling messages 111-H of the sub-queue Q2 are transmitted, and then the medium priority signaling messages 111-M are again sequenced at the sub-queue Q4, and again transmitted on the control channel 113 (e.g. to repeat their transmission).

The high and medium priority signaling messages 111-H, 111-M are again sequenced at the sub-queue Q6, and again transmitted on the control channel 113 (e.g. to again repeat their transmission).

Thereafter, the low priority signaling messages 111-L are combined with the high and medium priority signaling messages 111-H, 111-M and sequenced at the sub-queue Q7, and transmitted on the control channel 113, to first transmit the low priority signaling messages 111-L and again transmit the high and medium priority signaling messages 111-H, 111-M.

Transmission of the signaling messages 111-H, 111-M, 111-L at the sub-queue Q7 may repeat, for example a given number of times (e.g. per priority type), for example when transmission of signaling messages 111 in the sub-queue Q7 again occurs.

The continuous signaling messages 111-C are sequenced at the sub-queue Q8 and transmitted on the control channel 113, for example after signaling messages of the transmission of signaling messages 111 the sub-queue Q7 are transmitted. Hence, signaling messages 111 in the sub-queues Q1, Q2, Q3, Q4, Q5, Q6, Q7, and Q8 are transmitted in an order of sub-queues Q1, Q2, Q3, Q4, Q5, Q6, Q7, and Q8, and further then further signaling messages 111 in the sub-queues Q1, Q2, Q3, Q4, Q5, Q6, Q7, and Q8 again occur. When signaling messages 111 may be removed from the sub-queue Q7 when they reach a respective given number of repeats, and the like.

Furthermore, sequencing of signaling messages 111 in the sub-queues Q1, Q2, Q3, Q4, Q5, Q6, Q7, and Q8 may be continuous such that as signaling messages 111 the sub-queues Q1, Q2, Q3, Q4, Q5, Q6, Q7, and Q8 are transmitted, new signaling messages 111 may be sequenced at the sub-queues Q1, Q3, Q7, and Q8, and the queue device 107 generally otherwise cycles through the sub-queues Q1, Q2, Q3, Q4, Q5, Q6, Q7, and Q8.

Hence, as depicted, the data signaling messages 111 in the queue 109, sequenced at the sub-queue Q1, are first transmitted and repeated a most number of times, as compared to, for example, voice signaling messages 111 sequenced at the sub-queue Q3.

However, as depicted, the ranking engines 117 rank the signaling messages 111 received at the edge devices 115, and generate, and transmit, the rankings 119 to the computing device 101, which receive (e.g. at the block 302 of the method 300) the rankings 119. From the rankings 119, the computing device 101 may determine (e.g. at the block 304) an adjusted queue structure 401 and/or adjusted message priorities 403. For example, the edge devices 115 may have an increase in voice traffic which causes the ranking engines 117 to generate the rankings 119 to indicate that data signaling messages may be less useful than voice signaling messages and, with the queue structure depicted in FIG. 4, voice signaling messages may have relatively low effectiveness ratings. As such, the computing device 101 determines the adjusted queue structure 401 and/or adjusted message priorities 403 such that new voice signaling messages 111 have a higher priority than new data signaling messages 111 and/or such that new voice signaling messages 111 are repeated more often than new data signaling messages 111 in the queue 109, for example to increase the usefulness and/or effectiveness of the voice signaling messages in the rankings 119.

As depicted, the adjusted queue structure 401 and/or adjusted message priorities 403 are provided to the queue device 107 (e.g. as a command 405) which adjusts the queue accordingly.

For example, attention is next directed to FIG. 5 which depicts the queue 109 after being adjusted. As depicted, a message sequence is adjusted such that the high priority signaling messages 111-H comprise voice signaling messages 111 and the medium priority signaling messages 111-M comprise data signaling messages 111, with the signaling messages 111-L, 111-C being unchanged. Such changes may be defined by the adjusted message priorities 403.

Furthermore, as depicted a queue structure of the sub-queues Q1, Q2, Q3, Q4, Q5, Q6, Q7, and Q8 are adjusted such that the high priority signaling messages 111-H are sequenced in the sub-queues Q1, Q2, Q3, Q4 to repeat transmission the high priority signaling messages 111-H prior to the medium priority signaling messages 111-M being transmitted, as sequenced at the sub-queue Q5. Such changes may be defined by the adjusted queue structure 401. The remaining queue structure is similar to as depicted in FIG. 4. Hence, the signaling messages 111 are transmitted (e.g. at the block 306 of the method 300) according to the queue 109 as adjusted.

As depicted, the ranking engines 117 continue to generate the rankings 119, continue to be received at the computing device 101 which may continue to generate an adjusted queue structure 501 and/or adjusted message priorities 503 which may be used to again adjust the queue structure and/or the message sequence of the outbound signaling messages 111 at the queue 109, for example via a command 505. As such the queue 109 may be adjusted in a feedback loop with the rankings 119

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot adjust a queue structure and/or a message sequence of outbound signaling messages based on rankings, and/or a human mind cannot rank such outbound signaling messages at an edge device, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, at a computing device managing outbound signaling messages on one or more control channels, from one or more edge devices receiving the outbound signaling messages on the one or more control channels, rankings of previously transmitted outbound signaling messages;
   adjusting, at the computing device, one or more of a queue structure and a message sequence of the outbound signaling messages based on the rankings;
   transmitting, from the computing device, to the one or more edge devices, the outbound signaling messages according to one or more of the queue structure and the message sequence, as adjusted;
   determining respective priorities of the outbound signaling messages; and
   wherein adjusting one or more of the queue structure and the message sequence of the outbound signaling messages causes one or more of:
   repeats of higher priority outbound signaling messages to increase; and
   respective repeats of lower priority outbound signaling messages to one or more of: decrease, and be offloaded to a communication path different from that of the higher priority outbound signaling messages.

2. The method of claim 1, wherein the rankings, received from the one or more edge devices, rank the previously transmitted outbound signaling messages according to one or more of usefulness and effectiveness thereof,
   wherein the usefulness comprises an indication of one or more of: whether or not an edge device undergoes a change in state due to a received outbound signaling message; whether or not the edge device uses data from the received outbound signaling message, and
   wherein the effectiveness comprises an indication of lateness of the received outbound signaling message at the edge device.

3. The method of claim 1, wherein the rankings include a ranking for a given previously transmitted outbound signaling message defining one or more of:
   usefulness of the given previously transmitted outbound signaling message to an edge device, wherein the usefulness comprises an indication of one or more of: whether or not the edge device undergoes a change in state due to the given previously transmitted outbound signaling message; whether or not the edge device uses data from the given previously transmitted outbound signaling message;
   whether the given previously transmitted outbound signaling message was a repeat of another previously transmitted outbound signaling message;
   whether the given previously transmitted outbound signaling message was a data signaling message received by a data edge device or a voice edge device; and
   whether the previously transmitted outbound signaling message was a voice signaling message received by the data edge device or the voice edge device.

4. The method of claim 1, wherein the rankings include a ranking defining lateness of a received outbound signaling message at an edge device.

5. The method of claim 1, further comprising:
   correlating, at the computing device, the rankings with one or more of:
   time;
   sites with which the one or more edge devices are communicating;
   locations of the one or more edge devices;
   radio-frequency conditions associated with the one or more edge devices;
   incidents associated with the one or more edge devices;
   talkgroups associated with the one or more edge devices; and
   failure of the previously transmitted outbound signaling messages,
   wherein, adjusting one or more of the queue structure and the message sequence of the outbound signaling messages is further based on the rankings as correlated.

6. The method of claim 1, wherein adjusting one or more of the queue structure and the message sequence of the outbound signaling messages occurs for one or more specific sites, used by the one or more edge devices and the computing device to communicate on the one or more control channels.

7. The method of claim 1, wherein the computing device manages a plurality of respective queues for a plurality of sites, and adjusting one or more of the queue structure and the message sequence of the outbound signaling messages occurs for each of the plurality of respective queues for the plurality of sites.

8. The method of claim 1, wherein the rankings are correlated with times, and adjusting one or more of the queue structure and the message sequence of the outbound signaling messages occurs for given times.

9. The method of claim 1, wherein adjusting one or more of the queue structure and the message sequence of the outbound signaling messages comprises adjusting one or more of:
a number of queues in the queue structure;
transitions between the queues in the queue structure; and
positions of given outbound signaling messages in the queue structure.

10. A device comprising:
a communication unit; and
a controller communicatively coupled to the communication unit, the controller configured to:
receive, via the communication unit, from one or more edge devices receiving outbound signaling messages on one or more control channels, rankings of previously transmitted outbound signaling messages;
adjust one or more of a queue structure and a message sequence of the outbound signaling messages based on the rankings;
transmit, via the communication unit, to the one or more edge devices, the outbound signaling messages according to one or more of the queue structure and the message sequence, as adjusted;
determine respective priorities of the outbound signaling messages; and
adjust one or more of the queue structure and the message sequence of the outbound signaling messages by causing one or more of:
repeats of higher priority outbound signaling messages to increase; and
respective repeats of lower priority outbound signaling messages to one or more of: decrease; and be offloaded to a communication path different from that of the higher priority outbound signaling messages.

11. The device of claim 10, wherein the rankings, received from the one or more edge devices, rank the previously transmitted outbound signaling messages according to one or more of usefulness and effectiveness thereof,
wherein the usefulness comprises an indication of one or more of: whether or not an edge device undergoes a change in state due to a received outbound signaling message, whether or not the edge device use data from the received outbound signaling message, and
wherein the effectiveness comprises an indication of lateness of the received outbound signaling message at the edge device.

12. The device of claim 10, wherein the rankings include a ranking for a given previously transmitted outbound signaling message defining one or more of:
usefulness of the given previously transmitted outbound signaling message to an edge device, wherein the usefulness comprises an indication of one or more of: whether or not the edge device undergoes a change in state dude to a given previously transmitted outbound signaling message; whether or not the edge device uses data from the given previously transmitted outbound signaling message;
whether the given previously transmitted outbound signaling message was a repeat of another previously transmitted outbound signaling message;
whether the given previously transmitted outbound signaling message was a data signaling message received by a data edge device or a voice edge device; and
whether the previously transmitted outbound signaling message was a voice signaling message received by the data edge device or the voice edge device.

13. The device of claim 10, wherein the rankings include a ranking defining lateness of a received outbound signaling message at an edge device.

14. The device of claim 10, wherein the controller is further configured to correlate the rankings with one or more of:
time;
sites with which the one or more edge devices are communicating;
locations of the one or more edge devices;
radio-frequency conditions associated with the one or more edge devices;
incidents associated with the one or more edge devices;
talkgroups associated with the one or more edge devices; and
failure of the previously transmitted outbound signaling messages, and
wherein the controller is further configured to adjust one or more of the queue structure and the message sequence of the outbound signaling messages further based on the rankings as correlated.

15. The device of claim 10, wherein the controller is further configured to adjust one or more of the queue structure and the message sequence of the outbound signaling messages for one or more specific sites, used by the one or more edge devices to communicate on the one or more control channels.

16. The device of claim 10, wherein the controller is further configured to:
manage a plurality of respective queues for a plurality of sites; and
adjust one or more of the queue structure and the message sequence of the outbound signaling messages for each of the plurality of respective queues for the plurality of sites.

17. The device of claim 10, wherein the rankings are correlated with times, and the controller is further configured to adjust one or more of the queue structure and the message sequence of the outbound signaling messages for given times.

18. The device of claim 10, wherein the controller is further configured to adjust one or more of the queue structure and the message sequence of the outbound signaling messages by adjusting one or more of:
a number of queues in the queue structure;
transitions between the queues in the queue structure; and
positions of given outbound signaling messages in the queue structure.

19. A method comprising:
receiving, at a computing device managing outbound signaling messages on one or more control channels, from one or more edge devices receiving the outbound signaling messages on the one or more control channels, rankings of previously transmitted outbound signaling messages;
adjusting, at the computing device, one or more of a queue structure and a message sequence of the outbound signaling messages based on the rankings; and
transmitting, from the computing device, to the one or more edge devices, the outbound signaling messages according to one or more of the queue structure and the message sequence, as adjusted, wherein the computing device manages a plurality of respective queues for a plurality of sites, and adjusting one or more of the queue structure and the message sequence of the outbound signaling messages occurs for each of the plurality of respective queues for the plurality of sites.

\* \* \* \* \*